United States Patent [19]

Rethorst

[11] 4,168,044
[45] Sep. 18, 1979

[54] ENERGY CONSERVING SUPERSONIC AIRCRAFT

[75] Inventor: Scott C. Rethorst, South Pasadena, Calif.

[73] Assignee: Vehicle Research Corporation, South Pasadena, Calif.

[21] Appl. No.: 747,505

[22] Filed: Dec. 6, 1976

Related U.S. Application Data

[63] Continuation-in-part of Ser. No. 584,635, Jun. 6, 1975, Pat. No. 4,008,866, which is a continuation-in-part of Ser. No. 342,151, Mar. 16, 1973, Pat. No. 3,904,151.

[51] Int. Cl.$^2$ .............................................. B64C 21/00
[52] U.S. Cl. ................................. 244/1 N; 244/35 R
[58] Field of Search ................... 244/1 N, 35 R, 35 A, 244/15, 42 CC, 55, 207; 181/33 HB, 33 HC, 213, 215; 60/224, 226 R; 239/265.19

[56] References Cited

U.S. PATENT DOCUMENTS

| | | | |
|---|---|---|---|
| 2,891,740 | 6/1959 | Campbell | 244/15 X |
| 2,997,256 | 8/1961 | Walker | 244/15 |
| 3,677,501 | 7/1972 | Denning | 244/55 |
| 3,815,848 | 6/1974 | Alperin | 244/1 N |
| 3,904,151 | 9/1975 | Rethorst | 244/1 N X |

OTHER PUBLICATIONS

"Velocity Distribution On Symmetrical Airfoils In Closed Terminals By Conformal Mapping", W. Perl et al., NACA TN 1642, p.45, Jun. 1948.

"Jane's All The World Aircraft 1969-1970", Tupolev Tu-144, p. 499, 8/14/1970.

*Primary Examiner*—Barry L. Kelmachter

[57] ABSTRACT

This invention is an extension of my system to recover into useful work the energy normally wasted by a supersonic aircraft in its shock wave mechanism. This system utilizes the excess propulsive jet velocity in a sheet below the wing to form a planar vortex flap which acts as a pressure shield. The present improvement extends the pressure generating forward concave wing undersurface of this system into an upward reflexed aft surface so as to benefit from the increased pressure provided by the downstream upwash vortex field. This allows the aft portion of the wing to serve as the energy recovery section by achieving the pressure required for lift on the undersurface of this aft wing portion at a lesser angle with reduced drag. This stream-wise series of functions specifies the wing undersurface as concave, convex, and concave sequentially in the flow direction, thus corresponding to the upper element of a planar supersonic nozzle. The jet manifold and its continuing vortex flap below comprise a reflecting concave, convex, concave lower element. Thus the underwing surface and vortex flap together comprise a planar converging/diverging nozzle, generating the pressure increase under the wing required for lift and recovering this pressure into velocity at the wing trailing edge. The vortex flap then simulates an extended chord wing, imparting downward momentum to a greater mass of air below, thereby operating at a reduced angle with less drag.

3 Claims, 5 Drawing Figures

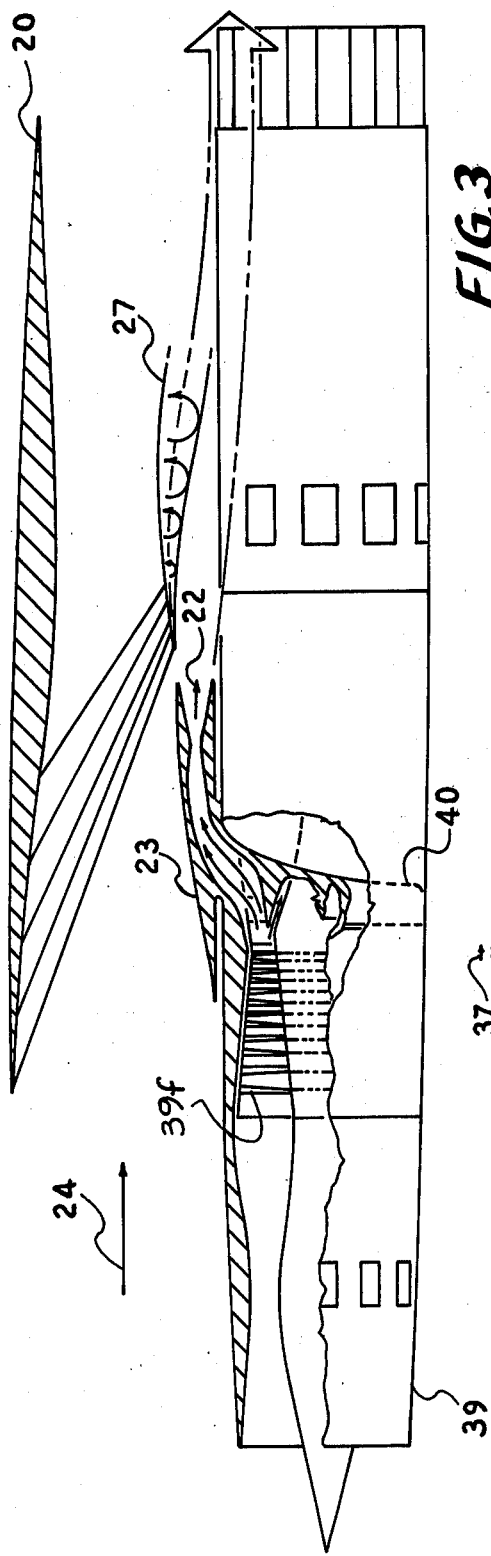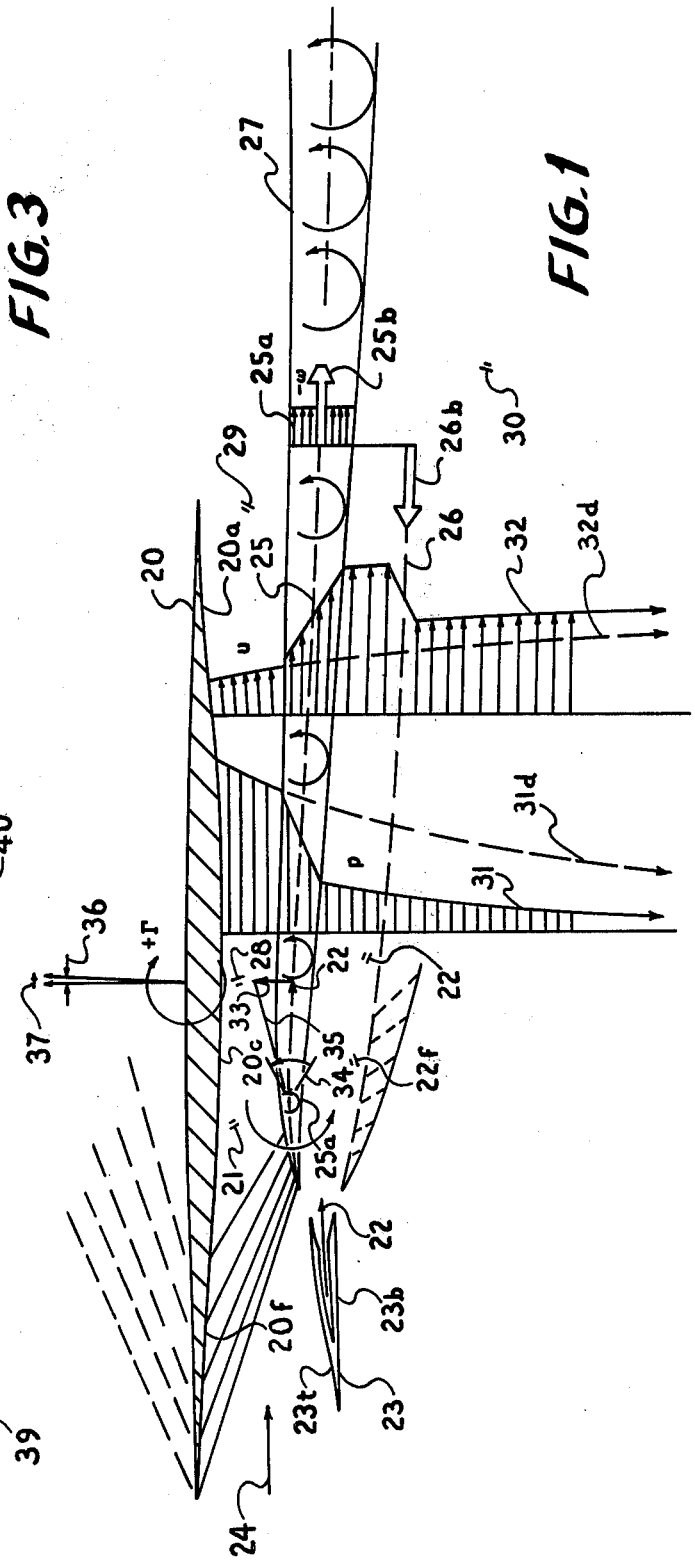

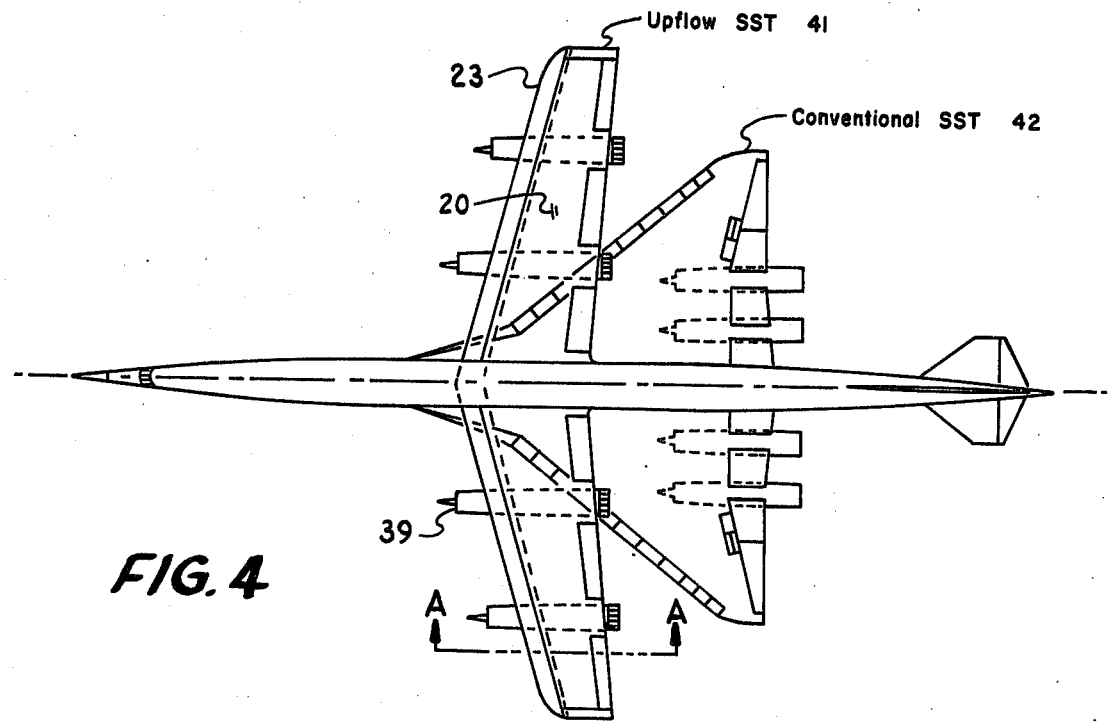
FIG. 4
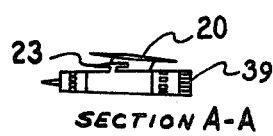
SECTION A-A
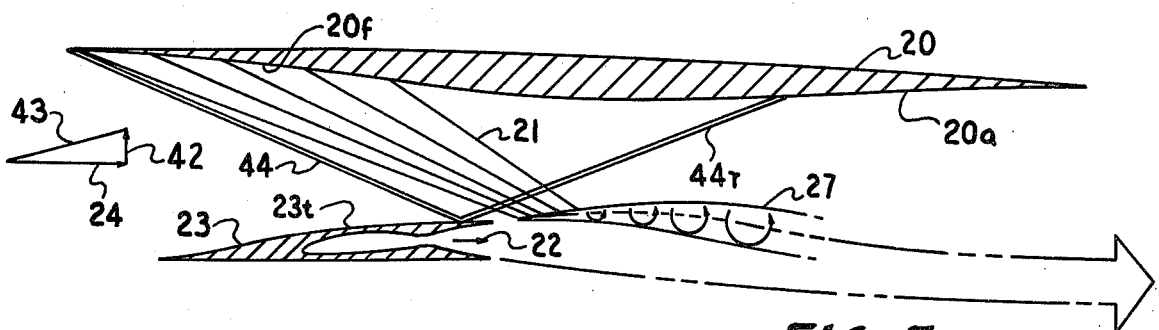
FIG. 5
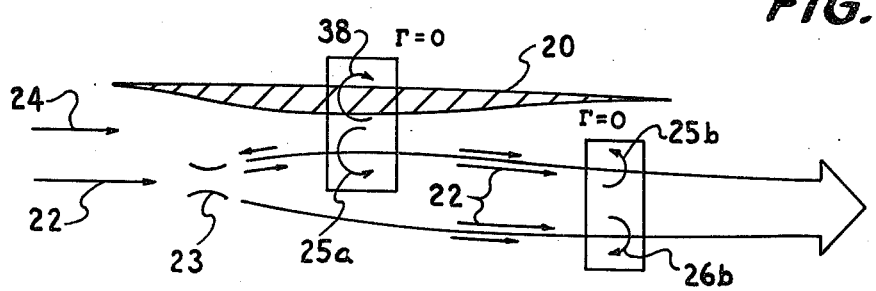
FIG. 2

ENERGY CONSERVING SUPERSONIC AIRCRAFT

This application is a continuation-in-part of my copending application Ser. No. 584,635, filed June 6, 1975, now U.S. Pat. No. 4,008,866, which is a continuation-in-part of Ser. No. 342,151, filed Mar. 16, 1973, now U.S. Pat. No. 3,904,151.

BACKGROUND OF THE INVENTION

A basic system to reduce the sonic boom created by a supersonic aircraft was disclosed in my U.S. Pat. No. 3,314,629, issued Apr. 18, 1967, providing a converging-/diverging nozzle emitting a supersonic jet of fluid aft underneath a concave downward lower surface of a supersonic wing. Thereafter a series of applications were filed employing the underwing energized jet of fluid in a particular way to recover the energy normally wasted in the shock wave system into useful work by transforming the compression into vorticity. The initial patent of this series was U.S. Pat. No. 3,904,151 issued Sept. 9, 1975, disclosing an aircraft wing system comprising an underwing manifold/nozzle assembly extending essentially the entire span of the wing and shaping the nozzle to emit this jet of fluid aft as a sheet spaced below the wing in an underexpanded manner, with a pressure greater than atmospheric. The opposing perturbation velocities on the interface between the underwing compressing air layer and the energized jet layer below generate negative (counterclockwise) vorticity, which in a supersonic flow provides an upwash downstream, increasing the pressure on the undersurface enabling the wing to operate at a lesser angle with reduced drag. My subsequent improvement application Ser. No. 584,635, filed June 6, 1975, now U.S. Pat. No. 4,008,866, specified the forward portion of the wing undersurface as concave, concentrating most of the compression in a short interaction region near its leading edge, corresponding to the short expansion region of the underexpanded jet. This structure locates the energy transformation mechanism under the forward part of the wing, leaving the aft part of the wing available for energy recovery.

BRIEF SUMMARY OF THE PRESENT INVENTION

The present invention provides a further improvement of this energy recovery system, particularly in shaping the aft section of the wing to recover the compression energy into useful work.

In this improved structure, the wing undersurface is reflexed upward in its aft extent, so as to benefit from the increased pressure provided by the vorticity and its upwash, retaining adequate pressure for lift but at a reduced local angle having a lesser drag component. Thus the total wing undersurface, as specified by the present invention, provides a contour essentially concave, convex, and concave in sequence in the streamwise direction. This undersurface thus comprises the upper element of a planar supersonic nozzle.

The manifold and its emitted jet, or more particularly the vortex flap generated on the upper interface between this jet and the underwing compressing air stream, comprise a reflecting concave, convex, concave lower element. Thus the wing undersurface and vortex flap below together comprise a planar converging-/diverging nozzle, generating an increased pressure under the wing to provide lift, yet recovering this pressure energy into velocity at its exit.

The vortex flap simulates an increased effective chord wing to the flow below, imparting the downward momentum to a greater mass of air, thus operating at a reduced angle with less drag.

BRIEF DESCRIPTION OF THE DRAWINGS

The foregoing and other readily apparent features of my present invention will be better understood by reference to the following more detailed specification and accompanying drawings wherein:

FIG. 1 is a cross sectional view of the wing and jet manifold emitting an energized jet thereunder, comprising a planar converging/diverging nozzle, showing the vertical profiles of the flow properties at the throat thereof.

FIG. 2 is a cross sectional view of the wing and energized jet thereunder, illustrating both (a) the equal and opposite basic vorticity components on the upper and lower interfaces of the jet due to its higher velocity with respect to the free stream flow, and (b) the additional negative (counterclockwise) vorticity developed on the upper interface due to the decreased velocity under the wing and the positive (clockwise) circulation developed around the wing in reaction thereto.

FIG. 3 is a cross sectional view of the wing and fan jet engine below located so that the fan air from its collector scroll feeds directly into the spanwise manifold.

FIG. 4 is a plan view of the present energy recovery aircraft overlaid on a conventional SST aircraft, illustrating in particular the spanwise manifold below the leading edge of the wing.

FIG. 5 is a cross sectional view of the wing and spanwise manifold, illustrating its gust alleviation capability via internal shock absorption.

DETAILED DESCRIPTION OF THE PREFERRED EMBODIMENT

In the following paragraphs like numbers refer to the same or similar items from figure to figure.

The basic structure of the present invention is illustrated in the cross sectional view of FIG. 1, providing a supersonic wing 20 compressing a layer of air 21 thereunder, which extends downward to a jet sheet 22 below emitted from a forward located manifold/nozzle 23.

The jet sheet 22, comprised of air energized by the engine fan 39f, to provide a propulsive force, is emitted with a velocity greater than the free stream 24, or the flight velocity. This increased velocity of the jet sheet 22 generates a layer of negative (counterclockwise) vorticity on the upper jet interface 25 by mixing with the underwing flow 21, and a layer of positive (clockwise) vorticity on the lower jet interface 26 by mixing with the outer flow 30. These two basic vortex sheets (not shown) are of equal magnitude and opposite sign, as represented by bold vectors 25b and 26b respectively of FIG. 1, and hence add zero net vorticity to the flow.

The supersonic wing 20 has an undersurface concave, convex, and finally concave in the streamwise direction. The forward section 20f is concave downward, comprising the compression section. The center section 20c is convex, providing a throat to the underwing flow. The aft section 20a is again concave downward, comprising the energy recovery section.

Under the forward compression section 20f the underwing flow 21 is decreased in velocity due to the compression and generation of pressure. Hence its interaction and mixing with the higher velocity jet sheet 22 below generates an additional negative vorticity contribution 25a on the upper interface 25.

Under the center throat section 20c a change in the flow gradients occurs smoothly, making a transition from the increasing pressure and decreasing velocity of the forward compression section 20f to a decreasing pressure and increasing velocity of the aft recovery section 20a.

Under the aft expansion section 20a, where the wing undersurface is reflexed upward, the flow expands, benefitting from the increased pressure due to the velocity 25a generated on the interface 25, maintaining the pressure required for lift at a lower angle of attack in this region, producing less drag, and with some portions providing a thrust component.

The jet sheet 22 and the two basic vortex layers 25 and 26, as well as the additional vortex contribution 25a, all continue as an assembly aft of the wing. The additional vorticity layer 25a sustains a pressure gradient not only under the wing but aft of the wing trailing edge as well, similar to a trailing edge flap, and hence is given the additional designation of a vortex flap 27.

The spanwise manifold/nozzle 23 outside shell is provided with a zero angle of attack on its flat bottom surface 23b and a concave upwards top surface 23t, corresponding to the concave downward undersurface of the compression section 20f of the wing above in its forward region. The expanding jet sheet 22, together with the layer of additional vorticity 25a on its upper interface also designated as comprising a vortex flap 27, thereafter combine with the convex center section 20c of the wing 20 above to form a throat 28 in the flow. The increasing pressure in the underwing flow 21 due to the additional vorticity 25a deflects the jet stream 22 and its vortex flap 27 downward, which in conjunction with the upward reflexed aft section of the wing undersurface 20a, provides an expansion region downstream of the throat 28 for the channel flow 21.

Thus the concave, convex, concave curvature of the undersurface of the wing 20, combined with the reflecting concave, convex, concave curvature of the vortex flap 27 below, provides a planar converging/diverging nozzle-like boundary 29 in the flow.

The vertical variation of the flow properties at the throat section 28 of this planar nozzle 29 is also shown in FIG. 1, illustrating the flow in the compression layer 21, extending down through the vortex flap 27 and into the flow field 30 below. These flow profiles illustrate the vertical variations in particular of (a) the pressure p 31 and (b) the velocity u 32. The additional vorticity component $\omega$ 25a is also shown.

The vorticity profile $\omega$ 25a illustrates the additional negative vorticity generated on the upper jet interface 25. The bold vectors 25b and 26b represent the equal and opposite sign basic vorticity contributions on the upper and lower surfaces respectively of the jet due to its higher velocity.

The pressure profile p 31 illustrates the vertical pressure gradient through the underwing flow field, and in particular the increase in pressure in the compression layer 21 adjacent the underside of the wing 20. The substantial pressure gradient shown through the vortex flap 27 is sustained by the asymmetric nature of its internal rotational structure due to compression of the fluid and the speed of sound, providing a vertical pressure shield. The lesser pressure rise 31 below the jet 22 caused by the vortex flap 27 is shown solid as compared with the usual profile 31d shown dashed.

The velocity profile u 32 illustrates the effect of the forward wing section 20f in reducing the velocity on its underside in the compression layer 21f. The increased velocity in the jet 22f employs viscosity on its interface to generate the vorticity corresponding to the substantial velocity gradient shown thru the upper jet interface 25. The lesser velocity gradient thru the lower boundary 26 of the jet is also illustrated, and the increased total velocity 32 below the jet provided by the vortex perturbation increment is shown solid for comparison with the usual profile 32d shown dashed.

The dashed and solid profiles shown in FIG. 1 illustrate the benefit derived from negative vorticity generation. Without the vorticity, the jet 22 would be deflected downward to a greater extent by the pressure generated from the wing 20. The outer flow 30 beneath the jet 22 would then in turn be subjected to greater downward deflection. This greater downward deflection is associated with higher static pressures (greater compression) and greater velocity decrease (as depicted by dashed lines on the pressure and velocity profiles). Thus, vorticity generation 25a on the upper jet interface 25 limits or reduces the compressive field produced by the lifting wing, primarily by the extended action of this additional vorticity aft of the wing as a vortex flap 27.

This longer effective chord/reduced angle wing system spreads the downward momentum producing the lift over an increased mass of air, leaving less energy in the wake, corresponding to a reduced drag. Thus a major portion of the energy in the vortex formation is recovered into useful work, and any residual energy is retained as vorticity in the flow stream at the aircraft altitude, where it will eventually decay into heat, precluding its transport towards the ground to generate a sonic boom.

The net result of this mechanism is to employ the vortex flap 27 as a pressure shield, providing in combination with the wing undersurface 20 above a planar nozzle, generating the pressure in the stream required for lift, but thereafter recovering the pressure energy back into velocity.

The additional vorticity 25a generated to provide this shield proceeds downstream with the flow, combining into a series of discrete rollers, all with a negative sense of rotation about spanwise axes, growing in an ordered manner, constituting the vortex flap 27. In a supersonic flow such a negative vortex 25a provides an upwash 33, reflecting the speed of sound restriction of its contribution to its downstream Mach cone 34. This upwash 33 adds to the stream velocity 22 to comprise an upward inclined flow 35 providing the increased pressure 31 on the underside of the wing, enabling the wing 20 to operate at a lesser angle 36 with reduced drag 37. The increase in underwing pressure developed by this mechanism provides a major alteration in the entire flow field, which follows from the severly altered gradients of the flow properties generated by rotation in the underwing vortex flap 27 as described.

This ability of a supersonic vortex flap to sustain a pressure gradient at first appears remarkable. The more familiar subsonic vortex sheet exhibits no such property. In fact, for incompressible flow, a pressure gradient can be sustained only by the centrifugal force of curved flow. But at supersonic speeds a pressure gradient in a stream can be sustained also by changes in density and velocity due to the domain restrictions of the speed of sound and the converse variation of these properties at supersonic speeds.

The shock wave itself is the most familiar example, where the pressure gradient is so severe as to be regarded as a discontinuity. The flow behind a normal shock has no change in direction, and the pressure gradient is sustained solely by changes in density and velocity. Thus Newton's second law, requiring a change in momentum to balance the force or pressure, is satisfied in incompressible flow by the product of a constant mass times the rate of change of velocity. But for compressible flow the change in momentum requires adding another term, namely the product of the velocity times the rate of change of density. This second term thus provides pressure gradients as a common feature of supersonic flows, and the present vortex flap is simply a further example of this mechanism.

Thus the rotational flow in the vortex flap 27 in the underwing region is deformed by the weight of the wing above. The fluid in such a vortex on its downstream side rotating upwards against this pressure is compressed. In the case of extreme pressure a normal shock would develop and lie horizontally across this upflow. In less severe cases this compression will take the form of oblique compression waves, oriented asymmetrically to turn the fluid while increasing its pressure, thus providing a pressure gradient in the local stream direction, which is normal to the free stream direction. On the upstream side of the vortex, where the vortex is rotating down away from the wing, the flow will expand, similarly providing a pressure gradient in the local flow direction, which again is normal to the free stream direction. Thus the vortices perform the role of diffusers, transforming the excess jet velocity into pressure in the upper vortex regions, providing a vertical pressure shield.

For cruise operation at a constant altitude, the pressure or lift will be maintained constant and equal to the weight, and hence the increased pressure 31 would be used to decrease the angle of attack 36 with a corresponding reduced drag 37. The attendant reduction in wing pressure drag 37 due to the reduced angle of attack 36 can then be used to estimate the improvement in lift/drag $(L/D)_u$ ratio for the upflow wing aircraft, which can most conveniently be calculated normalized to the lift/drag $(L/D)_o$ ratio for large conventional SST aircraft, where the drag due to lift is approximately one half the total drag. This improvement in lift/drag ratio provided by the compressible vortex upwash is shown by the following expression:

$$\frac{(L/D)_u}{(L/D)_o} = \frac{2}{1 + \frac{\alpha_u}{\alpha_o}} \qquad \alpha_u \geq 0$$

where $\alpha_u$ = wing angle of attack in vortex upflow
$\alpha_o$ = wing angle of attack with no upflow The angle ratio in the above expression may be evaluated by imposing the condition of equal lift, where the upflow wing lower surface pressure is augmented by the excess jet velocity diffusion and the conventional wing is without augmentation, and equated with the aircraft weight. The angle ratio may then be expressed as $$\frac{\alpha_u}{\alpha_o} = 1 - \frac{\Delta p_s}{W/S} \qquad \alpha_u \geq 0$$

where $\Delta p_s$ = shield pressure developed by excess jet velocity diffusion
W = aircraft gross weight
S = aircraft wing area The increased pressure 31 generated on the wing undersurface 20 by the vortex energy recovery mechanism may also be regarded as an increase in circulation about the wing. It is well known in fluid mechanics, as enunciated by Thomson's theorem, that if a flow is initially irrotational, it must remain irrotational thereafter. Thus when vortices are generated in the flow, an equal and opposite vorticity generation is required so that the total vorticity, initially zero, remains zero at all times. Hence from another point of view, the increased pressure on the underside of the wing 20 may be represented as an increased positive circulation (clockwise) generated around the wing itself in reaction to the additional negative (counterclockwise) vorticity 25a generated on the jet interface 25.

This overall system operation in terms of circulation Γ is illustrated in FIG. 2. The equal and opposite basic vorticity contributions 25b and 26b, on the upper and lower interfaces of the jet 22 respectively, due to its higher velocity, in effect cancel and provide zero net effect. The additional negative vorticity 25a on the upper interface 25, on the other hand, requires an equal and opposite reaction, which is of course the additional positive circulation 38 on the wing 20, corresponding to the pressure 31 generated by the vortex flap 27 as described.

The energized jet sheet 22 generating the vorticity transformation system described is provided by a fan jet engine 39 mounted below the wing 20 as shown in FIG. 3. The engine 39 is located so that its fan air collector scroll 40 feeds directly into the manifold 23 which in turn emits the jet sheet 22, generating the vortex flap 27 on its upper surface 25.

It is clear that this spanwise manifold/nozzle 23 is not simply added structure, but rather a relocation of ducting from the engine pod into the wing system. In this position it serves a double purpose in providing external blown flaps at take-off and possibly afterburning for acceleration to cruise velocity. Furthermore, the fan air would normally travel through the engine in a conventional aft discharge system about the same distance as now involved in the spanwise manifold; hence the internal friction drags of the two arrangements are of the same order.

The installation would appear to favor fan engines, with the hot exhaust discharged directly, and the fan air employed as the underwing sheet 22, being ducted spanwise at high pressure for discharge aft through the converging/diverging nozzle 23, as illustrated in FIG. 3. A fan air system would involve a greater mass flow and hence a higher propulsive efficiency, which would offset the second order penalty due to underexpanded jet emission. Furthermore, the fan air could be used dry to provide quiet lift augmentation for take-off, with remote afterburning if used at all employed only at altitude. Finally, the increased surface area of the fan air spread out as a lateral sheet should further reduce sideline noise.

The propulsive jet must have an energy level greater than atmospheric to provide thrust. The velocity of this jet for supersonic operation is often at least 50% greater than cruise velocity, depending on the mass ratio employed. This increase in velocity is more than adequate to match the decrease imposed by the wing on the underside compression layer. Hence the velocity differences on the upper interface 25 generating the additional vortex sheet 25a can be similar in magnitude, with half the vortex energy derived from wing compression and the other half provided by the propulsive jet. Thus the requirements imposed on the propulsion system for thrust and vortex generation are compatible.

The jet sheet propulsion system and compression energy recovery mechanism accordingly are well matched. At supersonic speeds the wing in generating pressure for lift unavoidably ties up additional energy in the form of compression; the propulsive system normally employs an excess jet velocity to minimize the mass flow and the corresponding machinery weight and frontal area. However, integration of this underside compression from the wing and excess velocity from the propulsion system in the vortex flap mechanism employs the mixing layer as a planar jet augmentation system, with the upward reflexed aft portion of the wing providing the surface on which the augmented pressure acts. This energy transfer both recovers the compression energy by transformation into vorticity and augments the mass of air involved in thrust to improve the propulsive efficiency.

The system disclosed incorporates many of the characteristics of an ideal self-propelled body; its transfer of energy from the jet layer to the underwing compression layer absorbs the propulsion excess of the former and avoids the velocity defect of the latter, providing in the limit zero energy discharge into the wake. Hence the overall system is synergistic.

The increased thrust due to this mixing process does not feed upstream at supersonic speeds to act on the nozzle; instead it appears downstream as a thrust component on the back side of the upward reflexed wing.

The energy conserving mechanism described leads to a configuration 41 similar to present conventional subsonic transports. Pod engines 39 are located forward and under a large aspect ratio wing 20 of modest sweep. The unique feature of the configuration is its underwing spanwise jet manifold 23, which is a relocation of the fan air ducting from the engine pods 39. This new SST configuration 41 is illustrated in FIG. 4 overlaid on a conventional highly swept SST 42.

This arrangement achieves the energy recovery benefits of a converging/diverging supersonic nozzle with the crucial distinction of providing lift. The wing 20 itself comprises the upper element of this planar nozzle and the spanwise manifold 23/vortex flap 27 comprises its lower element. The forward converging section generates an increased pressure, providing the required lift under the wing. The flow continues through a throat and expands thereafter downstream, where the pressure energy and its associated compression is recovered back into velocity at the nozzle exit or trailing edge of the wing. The wing system will then in principle have zero volume drag, recovering the compression energy associated with the volume of its component parts back into velocity.

The upper element of this nozzle, the wing itself, will have the lower surface of its aft section reflexed upwards providing a thrust component from the increased pressure. Further, the energy associated with compression due to the wing thickness, normally represented as drag due to volume, is proportional to the thickness ratio squared. The present system, by avoiding this volume drag, relaxes the usual constraints on this ratio, permitting use of a thicker wing having lower drag, less structural weight, more fuel capacity, and reduced friction drag.

The lower element of this nozzle begins with the spanwise manifold, which has a flat bottom and concave top, generating its volume compression entirely in a distributed field above. This balances the similar isentropic compression field generated by the concave downward wing, enabling recovery of this channeled compression energy downstream of the nozzle throat by expansion back into velocity. In principle, the volume drag of this spanwise manifold is obviated by recovery of its compression into velocity, and by reducing the drag of the wing above, even its own friction drag is compensated. The lower nozzle element continues downstream as the vortex flap, which sustains a pressure differential through its internal rotational structure, thereby providing a pneumatic segment to complete the lower surface of the converging/diverging nozzle, extending thereafter aft of the wing trailing edge, comprising an increased effective chord, spreading the aircraft weight downstream, transmitting downward momentum to a larger mass of air in a more efficient manner.

The underwing jet manifold/vortex flap system furthermore serves as a unique shock absorber to alleviate the effect of atmospheric gusts, as shown in FIG. 5. The underwing jet manifold 23 is located so that its emitted jet 22 is in position to interact with the field of weak compression waves 21 generated by the forward concave underwing section 20f. In the presence of a vertical gust 42, the local flow 43 forward of the wing is inclined upwards, increasing the angle of attack 36 of the wing, generating a strong shock 44 at its leading edge turning the flow horizontal. The underwing jet manifold 23 is located and shaped so that this leading edge shock 44, which is steeper than the weak compression waves 21 due to its increased strength, is intercepted and reflected from the solid top surface 23t of the jet manifold at a further shock 44r upward against the reflexed aft portion of the wing 20a, where it is cancelled by expansion as the flow is turned parallel to this wing undersurface.

This strong shock system 44 in the underwing compression layer 21, caused by the vertical gust 42, will dissipate a portion of this excess gust energy into heat as in a conventional shock absorber, rather than allowing the energy to be transmitted as a further pressure to impose structural loads on the aircraft wing 20 and discomfort on its occupants.

Corresponding to this energy absorption in the internal flow 21 will be an upward deflection of the vortex flap 27, acting like a spring, deforming momentarily to relieve the excess external load due to the increased flow angle on its lower surface.

It is clear from this disclosure and its accompanying set of figures that the means of transforming the compression energy generated by the underside of a supersonic wing into vorticity have been described in detail, and the magnitude of the provisions disclosed may be varied according to engineering considerations for different conditions as required.

While the preferred form and method of employing the invention have been described and illustrated, it is to be understood that the invention lends itself to numerous other embodiments without departing from its basic principles.

Having thus described my invention what I claim as novel and desire to secure by Letters of Patent of the United States is:

1. An aircraft having a wing and a nozzle
   said wing having a lower surface and an upper surface, said lower surface having forward concave, convex, and aft concave curvature sequentially in the stream direction, the two said surfaces together comprising a net positive angle of attack; and
   said nozzle is a manifold having an outside shell flat on its bottom and concave upward on the forward portion of its top, generating the compression associated with its volume in a layer of air above, balancing the compression generated in said layer by the wing itself, said nozzle having an outlet which is transversely elongate relative to the aircraft and through which in operation a supersonic stream of fluid is emitted, said outlet extending throughout substantially the entire span of the leading edge of the wing, said nozzle being spaced below the leading edge thereby forming an elongate gap between said leading edge and said nozzle through which said layer of air streams and is compressed by said wing lower surface, and wherein a vortex flap is generated on the interface between said compressed layer of air and said nozzle stream, providing pressure on the lower surface of the wing required for lift at a net reduced angle of attack with less drag during supersonic flight.

2. An aircraft having a wing and a nozzle
   said wing having a lower surface and an upper surface, said lower surface having forward concave, convex, and aft concave curvature sequentially in the stream direction, the two said surfaces together comprising a net positive angle of attack; and
   said nozzle is a manifold coupled to receive in operation fan air from a plurality of fan jet engines, said nozzle having an outlet which is transversely elongate relative to the aircraft and through which in operation a supersonic stream of fluid is emitted, said outlet extending throughout substantially the entire span of the leading edge of the wing, said nozzle being spaced below the leading edge thereby forming an elongate gap between said leading edge and said nozzle through which a layer of air streams and is compressed by said wing lower surface, and wherein a vortex flap is generated on the interface between said compressed layer of air and said nozzle stream, providing pressure on the lower surface of the wing required for lift at a net reduced angle of attack with less drag during supersonic flight.

3. An aircraft having a wing and a nozzle
   said wing having a lower surface and an upper surface, said lower surface having forward concave, convex, and aft concave curvature sequentially in the stream direction, the two said surfaces together comprising a net positive angle of attack; and
   said nozzle having an outlet which is transversely elongate relative to the aircraft and through which in operation a supersonic stream of fluid is emitted, said outlet extending throughout substantially the entire span of the leading edge of the wing, said nozzle being spaced below the leading edge thereby forming an elongate gap between said leading edge and said nozzle through which a layer of air streams and is compressed by said wing lower surface, and wherein a vortex flap is generated on the interface between said compressed layer of air and said nozzle stream, providing pressure on the lower surface of the wing required for lift at a net reduced angle of attack with less drag during supersonic flight, said nozzle having an outside shell and being located so that said supersonic stream of fluid emitted therefrom intercepts said compressed layer of air generated by said forward concave wing lower surface, whereas a stronger and steeper shock wave generated at the wing leading edge due to an atmospheric gust will be intercepted by the nozzle outside shell, reflected back upwards to said aft concave wing lower surface, and cancelled by expansion, and wherein the energy decay into heat by said shock wave, contained within said compression layer, will serve as a gust alleviation device or shock absorber providing a reduction in the loads and passenger discomfort normally experienced with a conventional wing system.

* * * * *